May 19, 1931.  E. MÖLLER  1,806,360

DIAPHRAGM PISTON, IN PARTICULAR FOR CONTROL VALVES FOR AIR BRAKES

Filed Sept. 28, 1929

Patented May 19, 1931

1,806,360

UNITED STATES PATENT OFFICE

ERNST MÖLLER, OF KARLSHORST, BERLIN, GERMANY

DIAPHRAGM PISTON, IN PARTICULAR FOR CONTROL VALVES FOR AIR BRAKES

Application filed September 28, 1929, Serial No. 395,825, and in Germany August 14, 1928.

This invention relates to pistons and piston chambers of control valves for compressed air brakes, of the kind wherein a diaphragm is used as the control piston, formed as a curved, slightly conical hollow body of rubber or other impermeable and sufficiently solid substance, and which unrolls in its movement along the housing surface surrounding it and shaped conically to correspond with the conicity of the diaphragm.

The chief object of the invention is to provide a diaphragm control valve which is free from defects that have been incident to constructions heretofore proposed.

For this purpose, the supporting piston necessary for the diaphragm is made of conical shape, its conicity running oppositely to that of the housing surface. With the use of such a supporting piston the annular surface of the diaphragm directly subject to the pressure remains always of the same width.

In order to protect the diaphragm from the injurious effect of the moisture and of oxidation, the usual ring provided to compensate the elasticity, as well as all those parts with which the diaphragm also comes into contact, may be made of a phenolic condensation product or other substance unaffected by water, oil and rubber. This material has also the advantage that it is exceedingly smooth, and thus the diaphragm is not exposed to any injury in its movement on this material. Furthermore, one or more holes may be provided at the lowest point in the housing opposite the diaphragm through which any moisture deposited from that carried by the air, can drip out again into the compressed air supply channel.

It is also an advantage to provide the diaphragm on one side with one or more small projections of any suitable shape in order to prevent an inverted insertion of the diaphragm in the housing, as in assembling the apparatus the diaphragm which is of conical cross section, might inadvertently be inserted with the side which should face the piston facing in the opposite direction, in which event deformations may take place, leading to damage, owing to which the action of the piston may be disturbed.

Further objects and advantages of the invention will be understood from the following description read in conjunction with the accompanying drawings.

In the casing or housing $a$ is inserted the usual bush $b$ which according to the invention has a conical inner surface and may consist of a phenolic condensation product or other similar substance. The diaphragm $c$ unrolls along this in its movement and has a supporting piston $d$ having a conicity opposite to that of the housing. Any moisture carried along by the compressed air can drip out into the supply channel $g$ through the hole $e$ in the housing cover $f$. There may be one or more small protuberances $h$ made in any suitable manner on the diaphragm $c$ fitting into corresponding holes of the disc $i$ so as to make the correct fitting of the diaphragm compulsory.

The method of operation will be seen from a consideration of the drawings.

In order to avoid the necessity of making the whole housing cover $f$ of a substance resisting water, oil and rubber (a phenolic condensation product or the like), a bushing $k$ of such material may be provided, which extends within the said cover as far as the diaphragm moves to its other end position (braking position).

Figure 1:
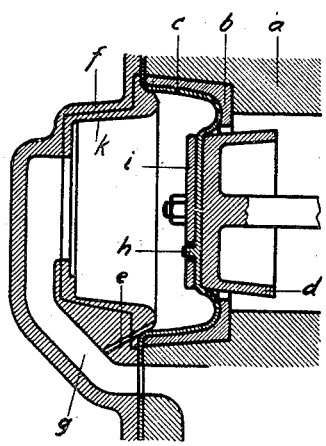
Figure 1 illustrates diagrammatically in longitudinal section a control valve exemplifying the invention, in the released position.
Figure 2:
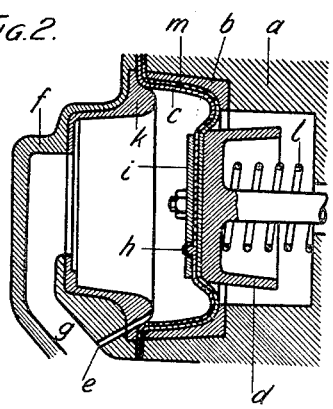
Figure 2 represents a somewhat modified constructional form in which the control valve is only stressed on one side by the pressure medium.

The control valve according to the invention may be used as a control valve subject to pressure on only one side as in the form shown in Figure 2. In this case the piston on the side remote from the pressure medium inlet conduit $g$ is provided with a spring $l$, which would cause the return of the piston when a reduction of pressure took place in the control chamber. It is then also preferable to provide the side of the diaphragm remote from the compressed air with a lining of solid impervious woven material $m$, having the same shape as the diaphragm, in order to prevent the diaphragm being blown through at the surfaces which are not supported.

What I claim and desire to secure by Letters Patent of the United States is:—

1. In a compressed air brake mechanism, the combination of a casing or housing, a piston reciprocable in said casing, a flexible diaphragm connecting the head of the piston and the peripheral wall of the casing, and a closure for the end of said casing remote from the piston having formed therein a channel, for supplying air under pressure to the casing, which communicates with the casing at a level above the lower surface of the casing chamber, and a bore for returning to said channel moisture that may collect in the casing adjacent the diaphragm.

2. In a compressed air brake mechanism, the combination of a casing or housing, a piston reciprocable in said casing, a flexible diaphragm connecting the head of the piston and the peripheral wall of the casing, a closure for the end of said casing remote from the piston having formed therein a channel, for supplying air under pressure to the casing, which communicates with the casing at a level above the lower surface of the casing chamber, a bushing within said closure around the mouth of said channel, and a conduit connecting the air channel with the interior of the casing between the inner end of said bushing and the diaphragm.

DR. ERNST MÖLLER.